(12) United States Patent
Bellehumeur

(10) Patent No.: US 6,886,653 B1
(45) Date of Patent: May 3, 2005

(54) SYSTEM AND METHOD FOR PREVENTING THE OPERATION OF A MOTOR VEHICLE BY A PERSON WHO IS INTOXICATED

(76) Inventor: Dennis Bellehumeur, 2819 NE. 38th St., Fort Lauderdale, FL (US) 33308

( * ) Notice: Subject to any disclaimer, the term of this patent is extended or adjusted under 35 U.S.C. 154(b) by 6 days.

(21) Appl. No.: 10/605,731

(22) Filed: Oct. 22, 2003

(51) Int. Cl.7 .............................................. B60K 28/02
(52) U.S. Cl. ..................................................... 180/272
(58) Field of Search ................................ 180/272, 271

(56) References Cited

U.S. PATENT DOCUMENTS

| | | |
|---|---|---|
| 3,811,116 A | 5/1974 | Takeuchi et al. |
| 3,823,382 A | 7/1974 | Gaddy |
| 4,592,443 A | 6/1986 | Simon |
| 4,613,845 A | 9/1986 | DuBois |
| 4,996,161 A | 2/1991 | Conners et al. |
| 5,793,292 A | 8/1998 | Ivey, Jr. |
| 5,969,615 A | 10/1999 | Ivey, Jr. et al. |
| 2003/0093187 A1 * | 5/2003 | Walker .......................... 701/1 |

* cited by examiner

Primary Examiner—Faye M. Fleming
(74) Attorney, Agent, or Firm—Malin, Haley & DiMaggio, P.A.

(57) ABSTRACT

A system and method to prevent a human being from operating a motor vehicle if the human being is intoxicated or under the effects of particular hallucinating drugs that uses a galvanic detector that can measure epidermal (skin) elements of a human being such as alcohol content, sweat and temperature continuously in conjunction with circuitry and logic circuits that connect to the vehicle's ignition system that only allow the vehicle to be operated when certain temperature sensing conditions are met and certain conditions requiring no alcohol are met otherwise the vehicle will be turned off. In an alternate embodiment, a glove could be used for epidermal measurements that is also connected to the sensing circuits.

3 Claims, 2 Drawing Sheets

SYSTEM AND METHOD FOR PREVENTING THE OPERATION OF A MOTOR VEHICLE BY A PERSON WHO IS INTOXICATED

BACKGROUND OF INVENTION

1. Field of the Invention

This invention relates to a system and method that will prevent a human being from operating a motor vehicle if that human being is intoxicated or under the effects of hallucinating drugs. The system includes the use of a galvanic detector that can continuously measure the alcohol or toxicity level of the human being in conjunction with override switches to prevent the motor vehicle from being started or operated after impairment levels of alcohol are detected.

2. Description of Related Art

Although much progress has been made in the United States of America against drunk drivers in the last decade, drunk driving continues to be the number one factor in fatal automobile and vehicle wrecks in the United States. The deaths, injuries and destruction caused by drunk drivers is totally preventable. Though systems have been devised that disable a motor vehicle based on a driver's alcohol level, such systems, because of the complexity, have not been employed as too costly or too easy to circumvent. Some devices have used coordination measurement which requires the user to push buttons in a random order within a given amount of time in order to allow the vehicle to be started. Other systems have used detectors for analyzing the breathe of the vehicle operator in order to start the car.

U.S. Pat. No. 5,969,615 issued to Ivey Jr., et al., Oct. 19, 1999, shows a system for monitoring and covering the use of a hand operated machine by an impaired individual through detection of toxins in the individual. This system uses vapor from an individual's hands that is drawn through a sampling apparatus. The resultant signal is used to estimate the alcoholic content of the individual. The complexity of this system, the overall accuracy and the expense would seem to limit its use on a practical level.

U.S. Pat. No. 4,592,443 issued to Simon, Jun. 3, 1986, shows a sobriety interlock which includes an apparatus for detecting alcohol on the breathe that is connected into the ignition system of a vehicle. The use of breathe analyzers which are not that accurate and which require an initial sensing is not practical for use in conjunction with a vehicle during its operation.

U.S. Pat. No. 4,996,161 issued to Conners, et al., Feb. 26, 1991, shows another breathe alcohol testing system that may be used in conjunction with a vehicle. Although the breathe analyzer of this device may be highly accurate, its interaction with a vehicle which requires a person driving to breath into constantly is impractical. Another human being could breath into the device in order to get the car started.

U.S. Pat. No. 3,823,382 issued to Gaddy, Jul. 9, 1974, shows a system for inhibiting motor vehicle operation by inebriated drivers. This device uses a breathe analyzer that measures the alcohol level in order to prevent the car from starting.

U.S. Pat. No. 3,811,116 issued to Takeuchi et al., May 14, 1974, shows a device for detecting mental impairment in a driver that includes a degree of fatigue or drunkenness. This device uses critical flicker frequency for judging the mental ability which has been termed fusion of a flicker for operating a vehicle.

U.S. Pat. No. 5,793,292 issued to Ivey Jr., Aug. 11, 1998, also shows a device to prevent hand operated machines from being operated by an impaired individual by measuring toxins of the person. The system measures and detects the toxins in an individual that can have sensors that interact with the vehicle.

U.S. Pat. No. 4,613,845 issued to DuBois, Sep. 23, 1986, shows an apparatus for preventing operation of machinery by one who is intoxicated. The devices uses an alcohol sensor located near the control panel on a portion of the steering wheel.

While many of the devices in the prior art attempt to solve the problem of preventing a person who is intoxicated from operating a motor vehicle, the complexity and expense of the units make it impractical for use in present day automobiles and road vehicles. The present invention overcomes these problems by providing a direct, continuous, galvanic measurement through the epidermis of a person operating a vehicle as to the alcohol or toxin level of the person operating the vehicle that can be continuously supplied to a sensing and actuating system that can be used to inhibit the ignition, steering lock or other parts of the vehicle to prevent a person who has a predetermined amount of alcohol or toxins in his system from driving the vehicle. The present system will be economical to install and practical for use to prevent drunk driving and save thousands of lives and perhaps billions in medical, insurance and social service (government) dollars.

SUMMARY OF INVENTION

A system and method for use in a vehicle such as an automobile or truck that has a conventional combustion engine that employs an electrical spark system and ignition system for preventing the vehicle from being driven by a person who has consumed alcohol beyond a point of legal baseline.

The system includes a galvanic skin sensor that can provide trans-dermal monitoring of a person's skin for ascertaining whether or not the person has consumed alcohol and the person's skin temperature. The sensor is connected through an actuating switch control system that is mounted electrically, typically within the vehicle ignition system that can act as a cutoff switch based on the various inputs from the trans-dermal sensor.

The trans-dermal sensor may be formed as a cover mounted on the steering wheel of a vehicle or permanently implanted in the steering wheel with the sensing elements described herein. In an alternate embodiment, the driver of the vehicle would be required to wear one or two gloves that provide for continuous sensing of the wearer's epidermis for the trans-dermal sensor and/or an interaction between the gloves and the steering wheel sensors.

The interrupt system also includes a timing circuit that bypasses the sensing cutoff switching circuit to allow brief periods when the driver's hands are not in contact with the steering wheel during the normal use of driving.

In a typical automobile engine, there is an ignition system that requires the use of a key or an electronic type turn on device that allows the electrical system of the car engine that may include a coil which is connected to a set of spark plugs.

To operate the invention with the steering wheel sensor only, the vehicle would be operated in a normal manner. The vehicle would be equipped with the trans-dermal alcohol sensing instrument surrounding the steering wheel such that when the driver touches the steering wheel the driver's epidermis is in constant contact with some portion of the steering wheel surface either left hand or right hand. The steering wheel sensor includes a transmission wire or transmitter to the actual galvanic sensing device itself. This device is capable of measuring temperature continuously and through galvanic action, the presence of ethanol in the skin or epidermis of a person contacting the steering wheel. This also appears as minor sweat to the galvanic sensor. The entire galvanic sensor has an output signal that engages an electrical switch that is in direct series with the entire automobile ignition system including the key. If the galvanic sensor electrical switch receives a signal from the galvanic sensor that says that the driver has impairment levels of alcohol as measured with his trans-dermal or epidermis, then the circuit will open, shutting off the electrical current to the automobile spark plugs. In a diesel engine this could also be a switch that cuts off the fuel supply to the engine, shutting off the engine. A two minute warning will precede shut off.

If a person were driving that does not have alcohol in their blood that is measured through the trans-dermal alcohol sensing instrument, then the vehicle will operate normally. If the driver constantly contacts and removes his hands from the steering wheel, it will not interrupt the automobile provided it does not exceed its predetermined time limit. One of the features of this device is that for the engine to continue running, there must also be a constant temperature measurement so that someone could not defeat the system by putting on special gloves to avoid detection of alcohol because there must be a human temperature of their hand on the wheel in order for the system to work continuously. However, with the time delay circuit that bypasses the trans-dermal sensing switch activator for short periods, a person can change hands or move their hands about the steering wheel without shutting down the system. For example, it would take 35 to 40 seconds of continuously non-thermal input before the time delay shut off.

In an alternate embodiment of the invention, the driver would be required to wear special gloves that include the trans-dermal sensors that can measure temperature and ethanol content continuously which would then be attached directly to the trans-dermal sensor and its switching action. Contact with the steering wheel would not be required specifically but the person wearing the gloves must periodically engage the steering wheel with the gloves on.

In yet another alternate embodiment, a combination of special gloves and special sensors on the steering wheel could require that the glove and steering wheel interact continuously in order to allow the engine to run so that someone could not try to defeat the system by not wearing the gloves.

It is an object of this invention to provide an improved system and method for preventing drunk or inebriated drivers from driving an automobile or truck or road vehicle or plane.

It is another object of this invention to provide a low cost, non-complex system that measures the alcohol level of a driver of a vehicle and interrupts or prevents the automobile from being driven when a particular level of alcohol is detected in the driver.

And yet still another object of this invention is to provide an alcohol detection system that provides continuous signals during the operation of a vehicle at all times that can measure accurately the alcohol level of the person driving.

In accordance with these and other objects which will become apparent hereinafter, the instant invention will now be described with particular reference to the accompanying drawings.

DETAILED DESCRIPTION

Figure 1:
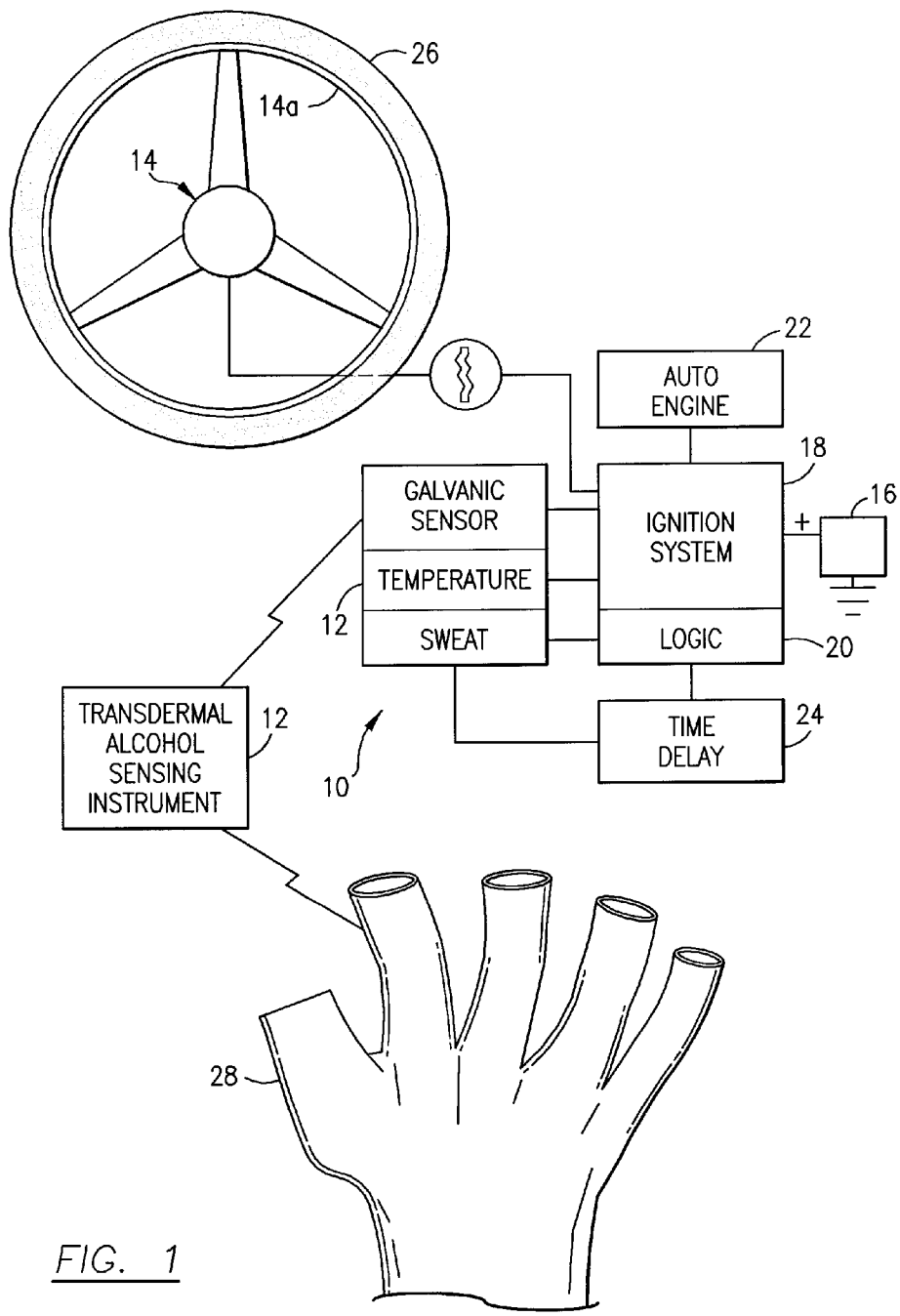
FIG. 1 shows a schematic diagram showing the system in accordance with the prevent invention.

Referring now to the drawings and in particular FIG. 1, the present invention is shown generally at 10 including a trans-dermal alcohol sensing instrument that includes a galvanic trans-dermal sensor that can measure alcohol, temperature and sweat in conjunction with the trans-dermal sensing surface 26 or a glove 28 that interacts to provide the signals representative of a continuous alcohol measurement for the driver. The operation of this alcohol sensing system is described fully in U.S. Pat. No. 5,944,661 which is hereby incorporated by reference. This patent reference is not the basis of the invention but shows an example of a trans-dermal alcohol sensing system that could be modified such a way as to be useful as an element of the present invention described herein.

The present invention is incorporated into a conventional automobile and basically connected to the ignition system 18 of an automobile. The system will require circuit logic 20 to be used in conjunction with a trans-dermal alcohol sensing instrument 12.

Figure 2:
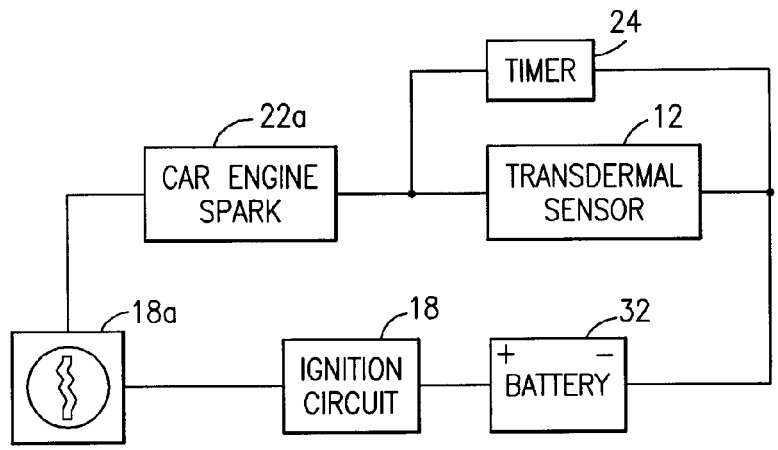
FIG. 2 shows a circuit diagram in accordance with the present invention.

Referring now to FIG. 2, as shown in FIG. 2, there is an ignition switch 18a that allows a key to turn on the automobile engine by providing power from a battery 32 through the ignition circuit 18 to the car engine spark system 22a. In order for spark to operate and current to reach the spark from the battery 32 through the ignition circuit, the signal must pass through the trans-dermal sensor and switch 12 or go through time delay 24.

If the system detects that the driver has alcohol content, then the trans-dermal sensor 12 and switch will open the circuit preventing electrical current from reaching the engine spark 22a, shutting off the engine with a pre-shut down warning time. This basically disengages the entire ignition circuit of the car. However, if the trans-dermal does not sense alcohol but is sensing temperature then the switch will not be activated in the trans-dermal sensor and current will flow to the car engine in a normal manner. However, should the driver move his hands about the wheel or change hands while driving for short periods of time with no temperature sensing, a system would shut off after an amount of time. The purpose of the timing circuit 24 is to allow current continue flowing even if there is no current flow through trans-dermal sensor and switch 12 from brief periods of time when the driver is moving his hands about the wheel.

Figure 3:
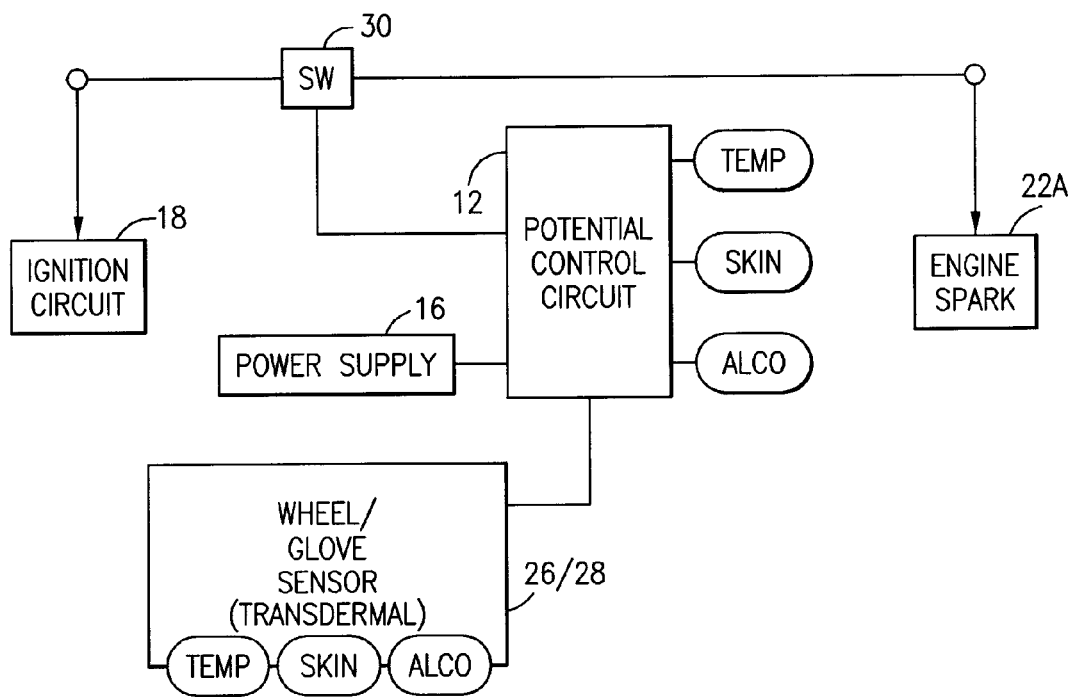
FIG. 3 shows a schematic circuit and operational diagram of the present invention as used in an automobile.

Referring now to FIG. 3, the specific operational system is shown with the cutoff switch 30 being mounted between the engine's spark and the ignition circuit. The trans-dermal potential control circuit 12 includes inputs that measure skin temperature, skin sweat and through its galvanic measurement device can detect alcohol using the skin of the user. This is described completely in U.S. Pat. No. 5,944,661 which has been incorporated by reference herein that describes a system that allows for a trans-dermal alcohol detection and which can provide a database or circuit to produce a control signal. In the present invention, this circuit has been modified such that the output, when alcohol is detected, is sent to a switch 30 that is the cutoff switch for the system. However, the system is also set up that in order for switch 30 not to shut off there must be constant temperature monitor too. So the logic of the system is set up such that it requires a constant skin temperature in conjunction with no alcohol input to allow switch 30 to operate. If the temperature is not measured or drops below a certain amount, switch 30 will be turned off and opened. If alcohol is detected in the potential control circuit 12, switch 30 will also be turned off even though there is sufficient temperature.

In the alternate embodiment and referring also back to FIG. 1, the system could include a galvanic detector in the form of glove 28 which is in direct contact with the driver's skin and which includes several sensors throughout for providing direct signals to the trans-dermal alcohol sensing instrument and a direct temperature signal at all times. The glove 28 shown in FIG. 1 as an alternate embodiment could also function eliminating the need for a special sensing cover 26 on steering wheel 14a in one embodiment. However, the sensing cover 26 could also include electrodes that interact with the epidermal glove 28 to also provide useful information that shows that the user's hand is engaged to the steering wheel and keeping the system on.

Although the sensitivity of the trans-dermal galvanic sensor for detecting alcohol could be varied, ideally a person should not be allowed to drive a car with any alcohol in his system. The particular present invention is capable of detecting very small levels of alcohol and would be suitable for zero tolerance program with respect to alcohol and driving automobiles.

And yet another alternate embodiment, the system could also galvanically detect cocaine or other drugs based on the chemical that is provided on the trans-dermal area of the skin.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system to prevent a human being from operating a motor vehicle if the human being has consumed a predetermined amount of alcohol comprising:

a steering wheel;

means attached and covering the steering wheel for sensing trans-dermal messages from skin of a human being including alcohol content and temperature;

an automobile ignition system that controls the operation of an automobile engine;

a galvanic sensor using trans-dermal inputs to measure alcohol, temperature and sweat content from said human skin, said galvanic sensor including an input from a steering wheel cover and an output to an automobile ignition system including a switching means; and logic circuit means for activating said switching means at any time said galvanic sensor senses alcohol in the operator of the vehicle causing the switch to open, shutting off electrical current in the ignition system to the engine.

2. A system as in claim 1, including:

at least one trans-dermal alcoholic sensing glove to be worn by the operator of the vehicle.

3. The method of preventing a human being from operating a motor vehicle if the human being has consumed an amount of alcohol beyond a predetermined limit comprising the steps of:

a. utilizing a galvanic epidermal sensor on the steering wheel of the vehicle for sensing the alcohol content of the skin of an operator of the motor vehicle;

b. providing a galvanic sensor logic circuit that receives signals from the galvanic sensor on said steering wheel concerning the alcohol content of a vehicle operator and provides it to an ignition switch;

c. providing a temperature sensing means on said steering wheel; and d. providing a logic circuit requiring temperature for a certain time period connected to said ignition switching means, said temperature sensor and time delay circuit requiring that over a period of time a certain temperature is required or the vehicle will be shut off notwithstanding the lack of alcohol sensing in the galvanic sensor.

* * * * *